United States Patent Office 3,042,091
Patented July 3, 1962

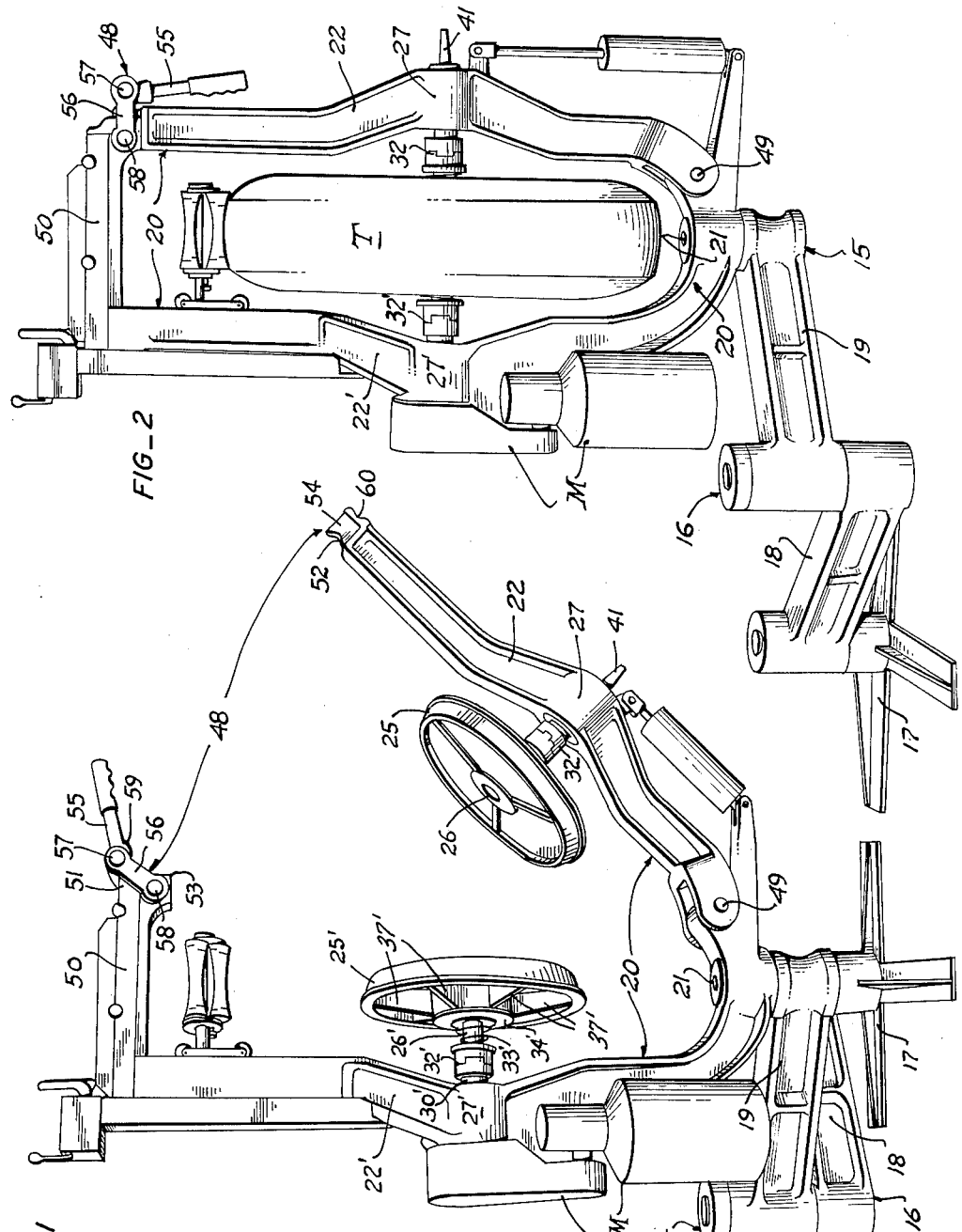

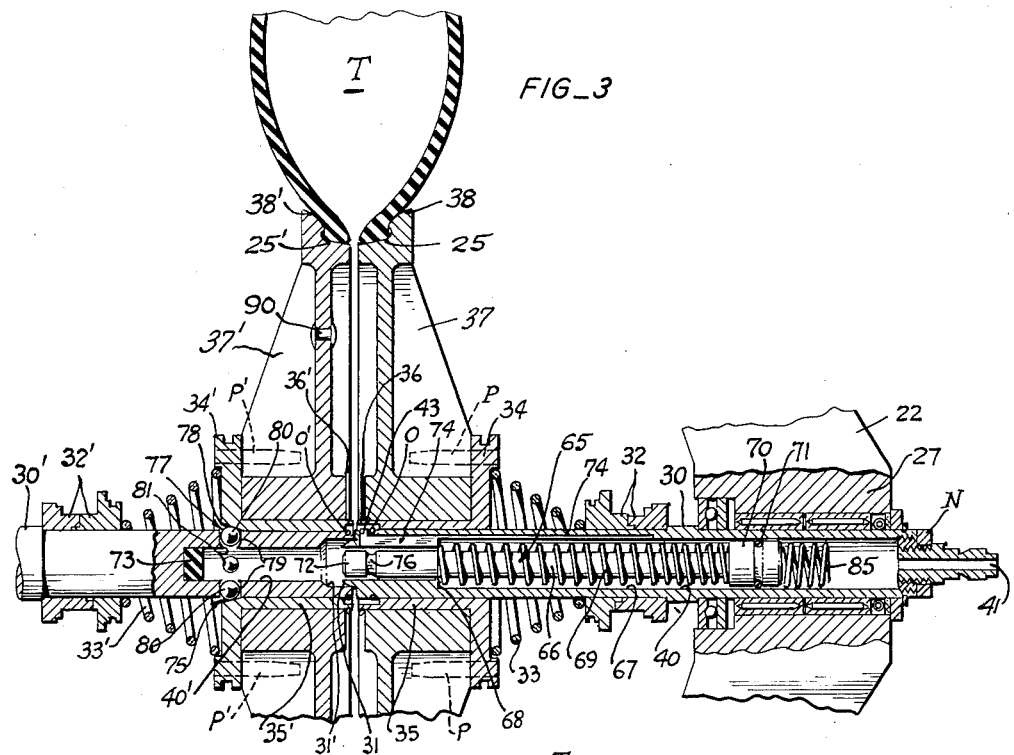
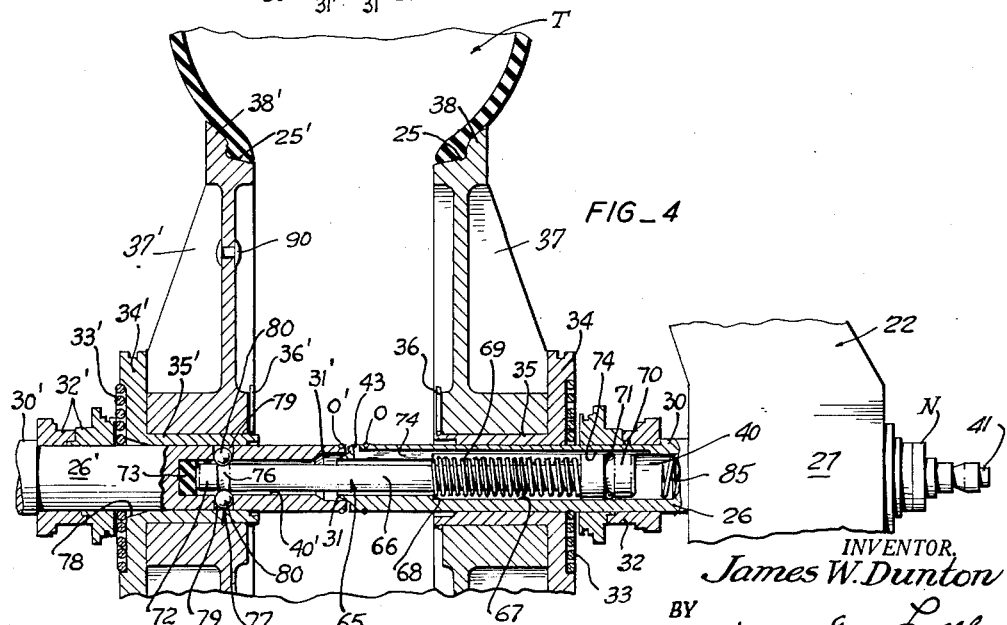

3,042,091
MEANS FOR LOCKING THE HALF SPINDLES OF SPLIT RIM TIRE MOUNT
James W. Dunton, Oakland, Calif., assignor to Elrick Rim Co., Inc., Oakland, Calif.
Filed May 31, 1960, Ser. No. 32,719
5 Claims. (Cl. 144—288)

This invention relates to tire buffing equipment and more particularly to certain novel improvements in a tire support commonly known as the split rim type facilitating quick mounting and demounting of a tire thereon.

The invention herein is particularly concerned with means for locking abuttable half spindles in aligned relation during inflation of a tire supported on split rims carried by said half spindles. In this connection reference is made to application Serial No. 839,706, filed September 14, 1959 for Tire Mount and Gauging Means for Buffing Machine made by Elmer Wesley Robertson assigned to my assignee of the present application.

Briefly the present invention has its environment in a tire mount in which a pair of disc wheels are supported for limited sliding movement away from each other on a pair of half spindles carried by openable yoke arms for receiving a tire between them, each said disc wheel having a half rim disposed to receive and support the tire between them for inflation to a limited pressure so as to present the tread rubber of the tire to a buffing rasp in a normal or nearly normal road condition for buffing to a proper contour and round.

In connection with the foregoing it should be noted that the openable yoke arms are secured in parallel relation by latch means during inflated buffing of the tire. At that time the half spindles are in abutting relation to each other as though they were one common spindle.

While this arrangement has been satisfactory under normal conditions, i.e., limited air pressure within the tire; and assuming that the yoke arms are each good firm castings without latent defects or flaws such as areas weakened by air pockets or sand pock marks during casting, the present invention contemplates the provision of an added safety factor such as to overcome accidental breakdown of the tire support during the buffing operation, i.e., when the tire discs and half rims are turning at a great rate of speed.

With the foregoing in mind the present invention contemplates the provision of a tie bar between the half spindles for withstanding outward movement of them away from each other during inflation of the tire supported thereon. In this manner the beam like structure of each yoke arm although secured together at each their ends will likewise be tied together midway their ends to withstand the stresses at their points of vulnerability to the greatest bending moment, i.e., in the region of the half spindles extending therefrom.

Accordingly it is an object of this invention to provide in combination with the tire inflating aspects of the tire mount a valve means coordinated with a tie bar for joining the half spindles together during inflation of the tire supported thereon.

Another object is to provide a retractable plunger in one of said half spindles extendable into the other of said spindles for uniting them with each other.

It is another object to provide means for locking the retractable plunger in extended position during continued inflation of the tire supported on the half spindles.

Another object is to provide a novel locking means coordinated with the inflating means so as to effect the locking condition automatically once the inflation of the tire has been achieved.

It is yet another object to provide a pair of half spindles in a split rim tire support with a retractable plunger operable upon admission of air into the tire to effect a bridge between the half spindles and means operable upon complete inflation of the tire for locking the plunger in bridging condition between the two half spindles.

These and other objects and advantages of the present invention will become more apparent from a reading of the following description in the light of the drawings in which:

FIG. 1 is a perspective view of a tire buffing arbor having the tire support and gauging means of the present invention embodied therein.

FIG. 2 is an elevational view of the tire support of the present invention with a tire supported therein.

FIG. 3 is an enlarged fragmentary section axially of the spindles when in abutting relation as illustrated in FIG. 2.

FIG. 4 is a view similar to that of FIG. 3 with the half spindles locking in abutting relation in accordance with the present invention.

General

In general the present invention is embodied in a tire buffing arrangement of the type in which a tire to be buffed is supported for rotation on horizontal spindles journaled in a support swingable in a horizontal plane whereby the periphery of the tire is presented for tangent engagement with a power driven buffing drum supported on an adjacent arbor.

More specifically, the overall arrangement as shown in FIG. 2 is adapted to be associated with a buffing drum disposed for rotation on a horizontal arbor powered by a motor and supported on a standard adjacent the tire mount. The tire mount embodying the present invention, generally designated 15, is supported adjacent the arbor in the usual manner so as to present the periphery of a tire to be buffed for tangent engagement with the rasping face of the buffing drum.

Tire Support

The support 16 for the tire mount 15 consists of a pedestal 17 having a pair of pivoted arms 18 and 19 pivotally mounted thereon for swinging movement in a horizontal plane. A tire supporting frame in the form of a fork-like yoke 20 has a vertical pin 21 at its bight pivotally mounted at the end of the outermost arm 19 so that the yoke can be rocked about horizontally relative to the dual swing arms 18 and 19. In this manner the yoke 20 provides a pair of upright legs 22 and 22' between which to support a tire T. The tire T is adapted to be supported on a pair of discs providing rim halves 25 and 25' each mounted on a half spindle 26—26', respectively, each journaled midway up a respective one of the upstanding legs 22 and 22' of the yoke 20. To this end each leg 22 and 22' is provided with a boss 27—27' each housing a roller bearing and having thrust bearings on their inner sides against which a collar 30—30' on the half spindles 26—26' respectively bears.

The outer end of half spindle 26' is keyed to and coaxially of a drive shaft drivingly connected to a motor M. In the disclosure of FIGS. 1 and 2 the motor M has its housing secured to the arm 22' flush with outside face of the boss 27' thereon. The outer end of the other half spindle 26 is threaded to receive a nut N which bears against the outer face of the boss 27 on the arm 22. The inner end of half spindle 26' has an axial bore 31' adapted to receive a reduced, beveled end 31 of the other half spindle 26 when the yoke 20 is in closed condition.

The two rim halves 25 and 25' are identical and interchangeable and for this reason are releasably mounted on the respective half spindle 26 and 26'. This is important from the standpoint of adapting the tire support for tires of larger and/or smaller diameter.

Spreader type collars 32—32' are provided on each half spindle for adjusting the width of rim to suit tires of various widths. These spreader collars bear against the collar 30—30', respectively, on the half spindles 26—26' and form the base against which the small convolute of a spiral spring 33—33' bears. The opposite or larger convolute of the spring 33—33' bears against a flanged end 34—34' of a hub 35—35' mounted on the respective half spindle 26—26' and adapted to receive the respective rim half 25 and 25'. The hub 35—35' is keyed to its respective spindle shaft 26—26' in a well known manner and each hub 35—35' is pressed against the spiral spring 33—33' and secured longitudinally of the spindle 26—26' and against removal therefrom under the influence of the spiral spring by a neoprene washer or O ring O—O'.

Replaceable Rims and Rim Diameter

The rim halves 25 and 25' by the same token is secured to the hub 35 and 35', respectively, by a snap ring 36—36' which seats in an annular groove formed in the hub 35—35' adjacent the inner end thereof. Each flange 34—34' has inwardly extending pins P—P' radially arranged thereon about the hub 35—35' so as to extend into bores provided in web-like spokes 37—37' of the respective rim halves 25—25' for turning the same with the hub. Since the hub 35' is keyed to the half spindle shaft 26' which is drivingly connected to the motor M it will be appreciated that when a tire T is mounted on the rim halves 25—25' to couple them, both of the split rims, their hubs and spindle shafts will turn in unison.

The rim halves 25—25' each have a tire bead engaging flange 38—38' for maintaining the tire in engagement therewith. In this connection note that one of the half spindles 26 has a center bored cylinder 40 communicating with an air supply conduit 41 in turn communicating with a source of constant air supply (not shown). This air supply conduit 41 has an air regulator in line with it to limit the air supply to a predetermined admittance valve. Note also that each of the rim halves 25—25' is formed on a solid disc so that air passing through the bore 40, and escaping therefrom via a port 43 into the space between the rim halves 25—25', flows into the cavity of the tire T to inflate it even during rotation.

Safety Valve

In providing a source of constant air supply under pressure to the space between the rim halves 25—25' to inflate the tire thereon it has been found that a pressure beyond an allowable limit should be avoided to assure against accidental over inflation of the tire. A pressure of 5 pounds per square inch is sufficient to brace the tire for buffing and any pressure beyond 12 pounds per square inch may unduly strain the seal between the tire beads and half rims or put an undue stress on the tire supporting frame. For these reasons it is desirable that some form of relief valve be provided to assure against excess pressures building up within the tire and space between the discs of the rim halves 25—25'. Such a relief valve is shown at 90 in FIGS. 3 and 4 in the form of a blow out plug in one of the disc wheels. The plug 90 is calculated to yield at pressure in excess of allowed limits so as to assure relief of pressure of the air between the disc wheels.

In connection with the foregoing it should be borne in mind that the spiral spring 33—33' is interposed between the spreader collar 32—32' and the rim half 25—25', respectively, when the deflated or relaxed tire body is mounted on the split rims as shown in FIG. 3. However as seen in FIG. 4 these spiral springs will yield when pressure builds up in the tire to cause the tire to spread the rim halves until the spiral springs are fully collapsed, i.e., flattened out, between the hub 35—35' and the collar 32—32' which limits outward movement of the split rims.

Openable Yoke

Contrasting FIG. 1 with FIG. 2 it will be noted that the support yoke 20 of the present invention is openable to receive a tire to be mounted on the wheel made up of the split rims. In combination therewith there is provided means 48 for releasably latching the openable arms 22—22' of the yoke in closed condition.

To accomplish the openability of the yoke one arm 22 thereof is pivotally mounted as at 49 for movement relative to the other arm 22' at the bight of the yoke, i.e., adjacent the vertical pin 21 by which the yoke is mounted upon the dual arms 18—19 for horizontal swinging. It will thus be appreciated that the arm 22 is movable while the other arm 22' is stationary although both are swingable as a unit or common yoke.

The latch means 48 is at the upper or opposite ends of the yoke arms 22—22' for binding them together in spaced parallel relation. To this end the stationary arm 22' has a bridge piece or cross brace 50 formed integrally therewith so as to extend laterally therefrom to present one end 51 thereof for abutting relation with the free end 52 of the other or movable arm 22. The cross brace 50 has a flat flange 53 on its end 51 which is slotted to receive a vertical flange 54 formed on the free end 52 of the movable arm 22 to align the yoke arms with each other and prevent their rocking. A latch arm 55 pivotally mounted at 57 between parallel linkages 56 which in turn have their opposite ends embracing the end cross brace 50 pivotally connected as at 58 to the end 51 of the brace 50. In this manner the spaced linkages 56 are swingable over the free end 52 of the movable arm 22 to position the latch arm 55 for engagement therewith.

The latch arm 55 has a cam formation 59 eccentric of its point of pivotation 57 adapted to engage in a recess 60 formed on the edge of the upper free end 52 of the movable arm 22. The arrangement is such that when the latch arm 55 is turned upward the linkages 56 and cam 59 can pass over the upper end 52 of arm 22 and when latch arm 55 is swung by hand downwardly its eccentric cam 59 engages in the recessed edge 60 of arm 22 to bindingly latch the movable arm 22 against the cross bridge 50 of the yoke.

From the foregoing it will be appreciated that a tire T is easily mounted on the rim halves 25—25' which are carried by the respective arms 22—22' of the yoke. The workman need merely open up the yoke, place the tire on one rim half and close the yoke and latch the arms together. Thus it will be seen that the tire is completely encompassed by the closed yoke which moves as a unit about its vertical mounting pin 21 to present the periphery of the tire to the buffing drum.

Having thus described the environmental aspects of the present invention is now directed to FIGS. 3 and 4 disclosing means 65 for locking the half spindles thereof in abutting relation in accordance with the present invention.

As previously stated the half spindle 26 has an axial bore 40 communicating with a source of air under pressure via air supply conduit 41 secured to the outer end of the half spindle 26. As best seen in FIG. 3 this bore 40 has a plunger 66 guided for axial sliding movement therein. The plunger 66 is of a length such as to be wholly confined within the half spindle 26 and such as to enable bridging of the plunger 66 between both half spindles 26—26' as will later become apparent.

The bore 40 in half spindle 26 is of enlarged diameter a substantial distance outwardly from the beveled end 31 of spindle 26 so as to provide a cylinder 67 in the latter. This provides a shoulder 68 within the cylinder against which one end of a compression spring 69 bears. The spring 69 circumscribes the plunger 66 and has its opposite end bearing against an enlarged head 70 on the latter. The head 70 is a piston which slides in the cylinder 67 and has a piston ring 71 thereon to effect the usual seal between the piston and cylinder walls. As best seen in FIG. 3 the compression spring 69 is calibrated to draw the plunger 66 into the bore 40. In other words the plunger 66 is retractable relative to the half spindle 26 and is normally wholly disposed within the latter other than when a tire on the rim halves 25—25' is being inflated.

When the plunger 66 is wholly withdrawn into the half spindle 26 it will be noted (FIG. 3) that the piston 70 and its piston ring 71 are disposed within a full cylindrical wall of the cylinder. Consequently when air is admitted into the far end of cylinder 67 via supply conduit 41 the piston will be forced inwardly of the tire supporting arrangement so that the free end 72 of the plunger 66 will extend beyond the beveled end 31 of the half spindle 26.

In connection with the foregoing it will be noted that the other half spindle 26' is likewise provided with an axial bore 40' adapted to receive that end of the plunger 66 extending from the half spindle 26. The inner end or base of the bore 40' is provided with a bumper block 73, preferably of rubber or the like to absorb the shock of the hammer-like effect of the free end 72 of plunger 66 meeting therewith.

As previously stated the bore 40 in half spindle 26 is provided with an outlet port 43 by which air can escape from the bore 40 into the space between the disc wheels on which the tire T is supported for inflating the tire. However, it will be noted that the air under pressure entering the bore 40 via air supply line 41 does not begin to flow out of port 43 until after the plunger 66 has been shifted into extended position into the other half spindle 26'. More specifically the cylinder 67 and bore 40 are each provided with a by-pass groove 74 which is milled out from the port 43 to a point within the cylinder 67 which is inward of the piston 70 when it is in retracted position (FIG. 3) but outwardly of that position of the piston 70 (FIG. 4) wherein the plunger is in fully extended position.

It will thus be seen that when the yoke arms 22—22' are secured in parallel relation by the latch means 48 with the half spindles 26—26' disposed in abutting relation as seen in FIG. 3 air may be admitted via air supply line 41 to extend the plunger 66 into bridging relation between the two half spindles 26—26'. Once the plunger 66 is driven home with its free end firmly pressed against the bumper plug 73 by the continuous pressure of air against the piston 70, air can now by-pass the piston via the passage groove 74 and discharge via outlet port 43 into the space between the disc wheels upon which the tire is supported.

As the tire T is inflated the disc wheels will be forced apart against the action of the spiral springs 33 and 33'. In other words, each of the hubs 35 and 35' slidably arranged on the respective half spindles 26—26' will likewise shift outwardly in relation thereto into the position shown in FIG. 4.

In connection with the foregoing the present invention entails the provision of means for securing the extended end 72 of the plunger within the half spindle 26'. This means 75 comprises an annual groove 76 formed in the plunger 66, shiftable means 77 carried by the half spindle 26' and cam means 78 on the hub 35 engageable with said shiftable means for extending the latter partially into the annular groove 76 in the plunger 66 for locking the latter relative to the half spindle 26' within which it is confined.

More specifically the shiftable means 77 includes a plurality of ball seats 79 and balls 80 in annular array around the half spindle 26' in a region thereof registerable with the annular groove 76 in the plunger when the free end 72 of the latter is seated against the bumper block 73.

The position of the ball seats 79 is further critical in that they are disposed in a zone of the spindle shaft 26' nearest the outer limits of the hub 35' when the latter is in non-inflated condition of the tire T as illustrated in FIG. 3. In other words, when the hub 35 is forced by helical spring 33' into normal position abutting against the O ring O' on the inner end of the half spindle 26'.

The cam means 78 comprises a funnel-like tapered open end formed on the outer side of the hub 35' so as to overlie the ball seats 79 formed in the spindle shaft 26' when hub 35' is in normal position as shown in FIG. 3.

Each ball seat 79 is drilled radially into the shaft 26' so as to communicate with the internal bore 40' therein. However, although these ball seats 79 are of sufficient diameter to receive and hold a ball 80 their base ends 81 are of a restricted diameter so as to prevent the balls from falling into the bore 40' when the plunger 66 is not disposed therein. That is to say, the balls 80 can extend only partially into the bore 40' but sufficiently so as to seat into the annular groove 76 and have their outer extremities bear tangently against the inner bore of the hub 35' so that the latter will press them firmly into groove engaging position as shown in FIG. 4.

It will thus be seen that when the plunger 66 is initially extended into the bore 40' the free end 72 of the plunger can force the balls 80 up, i.e., radially outward, relative to their seats 79, the cam funnel 78 being such as to allow for this yet serving to retain the balls 80 in their respective seats. However, when the hub 35' is shifted outwardly by the air pressure acting against the disc wheels upon which the tire is supported, the cam 78 rides over the balls 80 and shifts them firmly into their seats for partial extension into the annular groove 76 in the plunger to thereby lock the same in extended position as shown in FIG. 4.

With the foregoing arrangement it will be seen that the plunger 66 constitutes a locking tie bar between the two half spindles 26—26' so as to maintain them in true axial alignment. Moreover, the plunger 66 being locked in extended position between the two half spindles 26—26' any tendency for them to spread beyond abutting relation is substantially restrained so as to appreciably counteract outward bowing of the yoke arms 22—22' should they have latent defects or should the automatic relief of pressure within the tire T be effected by a faulty relief valve in the air pressure system. At all events the blow out plug 90 is calculated to blow out of the disc wheel should the pressure become too excessive.

When the buffing operation has been completed and the tire is deflated, the spiral springs 33—33' will again urge the hubs 35—35' back to normal position as seen in FIG. 3. Once this occurs the balls 80 are again in register with the cam funnel 78 and the air pressure ahead of the piston 70 being relieved, the compression spring 69 will force or withdraw the retractable plunger 66 back into the half spindle 26 whereupon the two half spindles 26 and 26' are free to move away from each other when the yoke arms 22—22' are opened up to the position shown in FIG. 1. It should here be noted that when the plunger 66 is free to return by action of the spring 69 there is a likelihood of the piston 70 being returned with such force as to damage it or the threaded connection at the outer end of the half spindle 26. For this reason I have included a rebound or shock absorbing spring 85 within the cylinder 67. This spring 85 freely floats within the cylinder 67 and is of sufficient strength to cushion the blow offered by the piston 70 under the influence of the return spring 69 by which the plunger is retracted into the half spindle 26.

While I have specifically described my novel improvement for locking split spindles of a tire buffing machine in detail it will be appreciated that the same may be susceptible to alterations, modifications and/or variations without departing from the spirit of my invention. I therefore desire to avail myself of all modifications, alterations and/or variations as fairly come within the purview of the appended claims.

What I claim as new and desire to protect by Letters Patent is:

1. In a tire buffing machine of the type in which a fork-like yoke has vertically disposed openable arms adapted to be secured in parallel relation provided with axially alignable hollow half spindles substantially midway their ends, each said half spindle slidably carrying a half rim disc for receiving and supporting a tire therebetween; means for locking said half spindles in axial alignment while abutting each other comprising a piston plunger supported in one of said half spindles for guided sliding movement axially thereof, spring means on said plunger normally retracting the same into said one of said half spindles, means for charging fluid under pressure into said one of said half spindles for extending said plunger therefrom into the other one of said half spindles, a by-pass passage in said one of said half spindles controlled by said plunger when shifted as aforesaid for admitting fluid under pressure between said discs for inflating said tire on said half rims, latching means in said other one of said half spindles adapted to engage that portion of said plunger therein for securing said plunger in extended position relative to said half spindles, and cam means on that side of the disc carried by said other one of said half spindles remote from the abutting end of the latter for operatively engaging said latching means and movable by the internal pressure of the fluid between said discs to engage said latching means for moving the latter into securing relation with said plunger for securing the latter in extended position during inflation of said tire.

2. In a split rim tire support for a tire buffing machine in which openable arms are provided with axially alignable hollow half spindles each slidably carrying a half rim disc for receiving and supporting a tire therebetween; the combination with means for securing said arms in tire supporting position of means for locking said half spindles in axial alignment and abutting relation comprising a piston plunger supported in one of said half spindles for guided sliding movement axially thereof, a plunger receiving passage axially of the other one of said half spindles, spring means on said plunger normally retracting the same into said one of said half spindles, means for charging fluid under pressure into said one of said half spindles for extending said plunger partially therefrom into the plunger receiving passage in the other one of said half spindles, a by-pass formed in said one of said half spindles for communicating the space between said discs with said fluid under pressure when said plunger is in extended position, said plunger having detent receiving means on its inner end, and radially movable means on said other one of said half spindles engageable by the disc thereon for urging said radially movable means inwardly into engagement with the detent receiving means on said plunger when said discs are spread apart under the influence of fluid under pressure therebetween for securing said plunger in extended position relative to said half spindles.

3. In a tire buffing machine of the type in which a fork-like yoke has hinged openable arms adapted to be secured in closed vertical position and in which axially alignable half spindles on said arms are brought into abutting relation and each carries a half rim disc for sliding movement thereon for supporting a pneumatic tire between said half rims; means for automatically locking said half spindles in abutting relation during inflation of said tire comprising a cylinder formed in one of said half spindles, a piston plunger guided for axial movement in said one half spindle, spring means normally retracting said piston plunger into said one of said half spindles, the other one of said half spindles having a sleeve passage adapted to receive the extendable end of said plunger, means for charging said cylinder with air under pressure for moving said piston plunger into the passage in said other one of said half spindles, said cylinder having an air passage communicating the charge of air under pressure with the space between said discs when said piston plunger is in extended position, said plunger having an annular groove on that end thereof extended into the other one of said half spindles, a plurality of ball seats formed radially around said other one of said half spindles and communicating with the sleeve passage therein via a reduced opening, a ball in each of said ball seats and extendable partially into said sleeve passage via the reduced opening communicating therewith, and cam means on that disc supported on said other one of said half spindles engageable with said balls when said discs are spread apart during admission of air under pressure therebetween for forcing said balls into said ball seats and into locking engagement with the annular groove on the end of said plunger.

4. In a tire buffing machine in which a fork-like yoke has openable arms hinged at one end and at their opposite end means for securing them in closed parallel relation and in which axially alignable half spindles supported midway the ends of said arms are brought into abutting relation and each carries a half rim disc slidably supported thereon for holding a pneumatic tire between said discs; means for automatically locking said half spindles in abutting relation during inflation of said tire comprising a cylinder formed in one of said half spindles, a plunger having a piston thereon guided for axial movement in said one half spindle, spring means normally retracting said plunger into said one of said half spindles, the other one of said half spindles having a sleeve passage adapted to receive the free end of said plunger when the latter is extended from said one of said half spindles, means for charging said cylinder with air under pressure for moving said piston within said one half spindle and for extending said plunger therefrom into the sleeve passage in said other one of said half spindles, said cylinder having an air passage communicating the air under pressure admitted thereinto when said plunger is in extended position with the space between said discs, said plunger having an annular groove on its free end, a plurality of ball seats formed radially around said other one of said spindles in the region of the annular groove on said plunger when the latter is extended into said other one of said half spindles, said ball seats communicating with the sleeve passage within said other one of said half spindles via reduced openings, a ball in each said ball seat and extendable partially into said sleeve passage via said respective reduced openings, and cam means on that disc supported on said other one of said half spindles engageable with said balls when said discs are spread apart under the influence of the air under pressure therebetween for forcing said balls into said ball seats and into locking engagement with the annular groove on the free end of said plunger.

5. In a tire buffing machine of the type in which a fork-like yoke has hinged openable arms adapted to be secured in closed vertical position and in which axially alignable half spindles on said arms are brought into abutting relation and each carries a half rim disc for sliding movement thereon for supporting a pneumatic tire between said half rims; means for automatically locking said half spindles in abutting relation during inflation of said tire comprising a cylinder formed in one of said half spindles, a piston plunger guided for axial movement in said one half spindle, spring means normally retracting said piston plunger into said one spindle, the other one of said half spindles having a sleeve passage adapted to receive the extendable end of said plunger, means for charging said cylinder with air under pressure for moving said piston plunger into the passage in said other one of said half spindles, said cylinder having an air passage communicating the charge of air under pressure with the space between said discs when said piston plunger is in extended position, said plunger having an annular groove on that end thereof extended into the other one of said spindles, cammable means on said other one of said spindles extendable upon being cammed into the passage of said other one of said spindles, and cam means on that disc supported on said other one of said half spindles engageable with said cammable means when said discs are spread apart during admission of air under pressure therebetween for camming said cammable means into said passage and into locking engagement with the annular groove on the end of said plunger.

References Cited in the file of this patent

UNITED STATES PATENTS

| | | |
|---|---|---|
| 1,947,957 | Tillman | Feb. 20, 1934 |
| 2,509,830 | MacMillan | May 30, 1950 |
| 2,534,845 | Woods | Dec. 19, 1950 |
| 2,695,520 | Karsai | Nov. 30, 1954 |
| 2,745,137 | Glynn | May 15, 1956 |
| 2,866,228 | French | Dec. 30, 1958 |
| 2,866,500 | George et al. | Dec. 30, 1958 |
| 2,903,029 | Twiford | Sept. 8, 1959 |
| 2,945,522 | Nelson | July 19, 1960 |